United States Patent
Tsuchiya

(10) Patent No.: US 6,662,777 B2
(45) Date of Patent: Dec. 16, 2003

(54) FUEL INJECTION DEVICE OF CYLINDER INJECTION TYPE INTERNAL COMBUSTION ENGINE AND FUEL INJECTION METHOD THEREOF

(75) Inventor: Tomihisa Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/215,047

(22) Filed: Aug. 9, 2002

(65) Prior Publication Data

US 2003/0041838 A1 Mar. 6, 2003

(30) Foreign Application Priority Data

Aug. 31, 2001 (JP) .......................... 2001-263494

(51) Int. Cl.⁷ ............................................... F02M 51/00
(52) U.S. Cl. .................... 123/299; 123/516; 123/491; 123/493
(58) Field of Search ................. 123/299, 516, 123/479, 493, 491

(56) References Cited

U.S. PATENT DOCUMENTS

| 4,424,785 A | * | 1/1984 | Ishida et al. ............ 123/479 |
| 5,331,937 A | * | 7/1994 | Clarke .................... 123/491 |
| 5,392,746 A | * | 2/1995 | Pontoppidan ............ 123/491 |
| 6,202,601 B1 | * | 3/2001 | Ouellette et al. ........ 123/299 |
| 6,325,051 B1 | * | 12/2001 | Oomori et al. .......... 123/516 |
| 6,408,828 B1 | * | 6/2002 | Wheeler .................. 123/479 |

FOREIGN PATENT DOCUMENTS

JP     A 2000-352335     12/2000

* cited by examiner

*Primary Examiner*—Erick Solis
(74) *Attorney, Agent, or Firm*—Oliff & Berridge, PLC

(57) ABSTRACT

A fuel injection device and method includes a main injection valve that injects a high-pressure fuel supplied to a delivery pipe into each combustion chamber of an engine, and an auxiliary fuel injection valve supplied with the high-pressure fuel from the delivery pipe. The auxiliary fuel injection valve is capable of injecting the high-pressure fuel in sucked air flowing in a surge tank when the engine is started under cold conditions. In addition, a fuel pressure can rapidly be increased in a starting phase since vapor in the delivery pipe can be discharged by temporarily opening the auxiliary fuel injection valve.

25 Claims, 11 Drawing Sheets

FUEL INJECTION DEVICE OF CYLINDER INJECTION TYPE INTERNAL COMBUSTION ENGINE AND FUEL INJECTION METHOD THEREOF

INCORPORATION BY REFERENCE

The disclosure of Japanese Patent Application No. 2001-263494 filed on Aug. 31, 2001, including the specification, drawing, and abstract is incorporated herein by reference in its entirety.

BACKGROUND OF THE INVENTION

1. Field of Invention

The present invention relates to a fuel injection device of a cylinder injection type internal combustion engine, which includes a main fuel injection valve for injecting a fuel into each combustion chamber of the engine with multiple cylinders, and being supplied with a high-pressure fuel from a high-pressure fuel channel, and to a fuel injection method thereof.

2. Description of Related Art

As for a spark ignition internal combustion engine for injecting a fuel into a combustion chamber or a so-called cylinder injection type internal combustion engine, an internal combustion engine, which includes an auxiliary fuel injection valve for injecting a fuel into an intake channel in addition to a main fuel injection valve for injecting the fuel into a combustion chamber, has been well known (see, e.g., Japanese Patent Laid-Open Publication No. 2000-352335). In a fuel injection device of the internal combustion engine described above, a portion of the fuel, necessary when the engine is started, is injected from the auxiliary fuel injection valve. Next, the injected fuel is mixed with sucked air flowing in the intake channel, and the mixture is vaporized. Then, the vaporized mixture is introduced into the combustion chamber to ensure desirable starting performance even under cold conditions.

In the fuel injection device, the fuel, supplied from a feed pump, is pressurized by a high-pressure fuel pump and is supplied to the main fuel injection valve. This enables fuel injection for desirable atomization against a pressure in the combustion chamber. On the other hand, the auxiliary fuel injection valve introduces the low-pressure fuel supplied from the feed pump, and injects the low-pressure fuel into the intake channel since pressurizing the fuel is unnecessary.

However, in the fuel injection device above, vapor may be generated in a high-pressure fuel pipe supplying the high-pressure fuel to the main fuel injection valve when the engine is started after high-temperature soaking. The vapor delays the pressurization of the fuel when the engine is started, so that the atomization of the fuel becomes insufficient, and the starting performance deteriorates.

In addition, it may be necessary to inject a small quantity of fuel from the main fuel injection valve to protect an exhaust emission-purifying catalyst when the engine is decelerating or returning from deceleration, or to prevent shocks when the engine is returning from deceleration. If a pressure in the high-pressure fuel pipe has not been lowered in advance in this case, the small quantity of fuel injection according to requirements cannot be gained, because of minimum injection time of the main fuel injection valve. As a result, fuel efficiency may be deteriorated, and it may not be possible to prevent the shocks when the engine is returning from deceleration.

To discharge the generated vapor described above or to lower a pressure of the high-pressure fuel, a special apparatus, which discharges the vapor and the high-pressure fuel from the high-pressure fuel pipe as desired, needs to be provided. However, if the apparatus is newly provided, the fuel injection device becomes complicated, increasing production cost.

SUMMARY OF THE INVENTION

It is one object of the present invention to provide a fuel injection device, which enables discharge of vapor in a high-pressure fuel channel and of a high-pressure fuel as needed without including a special apparatus, and a fuel injection method thereof.

A fuel injection device of a cylinder injection type engine, according to a first aspect of the present invention for achieving the object mentioned above, includes a main fuel injection valve which injects a fuel into each combustion chamber of the engine with plural cylinders, and pressurizes a low pressure fuel from a fuel supplying pump by a high-pressure fuel pump to supply the high-pressure fuel to a high-pressure fuel channel, and supplies the high-pressure fuel to the main fuel injection valve from the high-pressure fuel channel. Furthermore, the fuel injection device includes an auxiliary fuel injection valve which injects the fuel in an intake channel upstream of a branched point of the intake channel extending to each cylinder, and the auxiliary fuel injection valve is supplied with the high-pressure fuel from the high-pressure fuel channel.

The auxiliary fuel injection valve is supplied with the fuel from the high-pressure fuel channel, so that the fuel can be supplied to sucked air flowing in the intake channel with the use of the high-pressure fuel under cold conditions. In addition, when the engine is started after high-temperature soaking, vapor in the high-pressure channel can be discharged by opening the auxiliary fuel injection valve. Furthermore, in a case where the fuel pressure in the high-pressure fuel pump is decreased, a small quantity of fuel injection as desired can be realized immediately since a fuel pressure can be decreased by discharging the fuel in the high-pressure fuel channel as a result of opening the auxiliary fuel injection valve. This enables discharging of the vapor in a high-pressure fuel channel and the high-pressure fuel as desired without including a special apparatus for adjusting the fuel pressure.

In addition, an opening valve control of the auxiliary fuel injection valve can be performed to give assistance to adjustment of a fuel injection pressure of the main fuel injection valve.

With the opening valve control of the auxiliary fuel injection valve, the vapor is discharged from the high-pressure fuel channel, so that assistance can be given to increasing the fuel pressure by the high-pressure fuel pump. Furthermore, the fuel is discharged from the high-pressure fuel channel so that assistance can be given to decreasing the fuel pressure.

According to a second aspect of the present invention, a fuel injection method of a cylinder injection type engine is provided. The engine includes a main fuel injection valve which injects a fuel into each combustion chamber of the engine with plural cylinders, pressurizes a low pressure fuel from a fuel supplying pump by a high-pressure fuel pump to supply the high-pressure fuel to a high-pressure fuel channel, and supplies the high-pressure fuel to the main fuel injection valve from the high-pressure fuel channel. The fuel injection method includes closing the main fuel injection valve to cut off fuel injection into each combustion chamber in the cylinder injection type engine, injecting the high-pressure fuel into an intake channel upstream of a branched point of the intake channel extending to each cylinder through an auxiliary fuel injection valve from a high-pressure fuel channel when fuel injection from a main fuel injection valve is cut off.

The auxiliary fuel injection valve is supplied with the fuel from the high-pressure fuel channel so that the fuel can be supplied to sucked air flowing in the intake channel with the use of the high-pressure fuel under cold conditions. In addition, when the engine is started after high-temperature soaking, vapor in the high-pressure channel can be discharged by opening the auxiliary fuel injection valve. Furthermore, in a case where the fuel pressure in the high-pressure fuel pump is decreased as needed, a small quantity of fuel injection as desired can be realized immediately since a fuel pressure can be decreased by discharging the fuel in the high-pressure fuel channel as a result of opening the auxiliary fuel injection valve.

BRIEF DESCRIPTION OF THE DRAWINGS

The foregoing and further aspects, features and advantages of the invention will become apparent from the following description of the exemplary embodiments with reference to the accompanying drawings, and wherein.

DETAILED DESCRIPTION OF EXEMPLARY EMBODIMENTS

Figure 1:
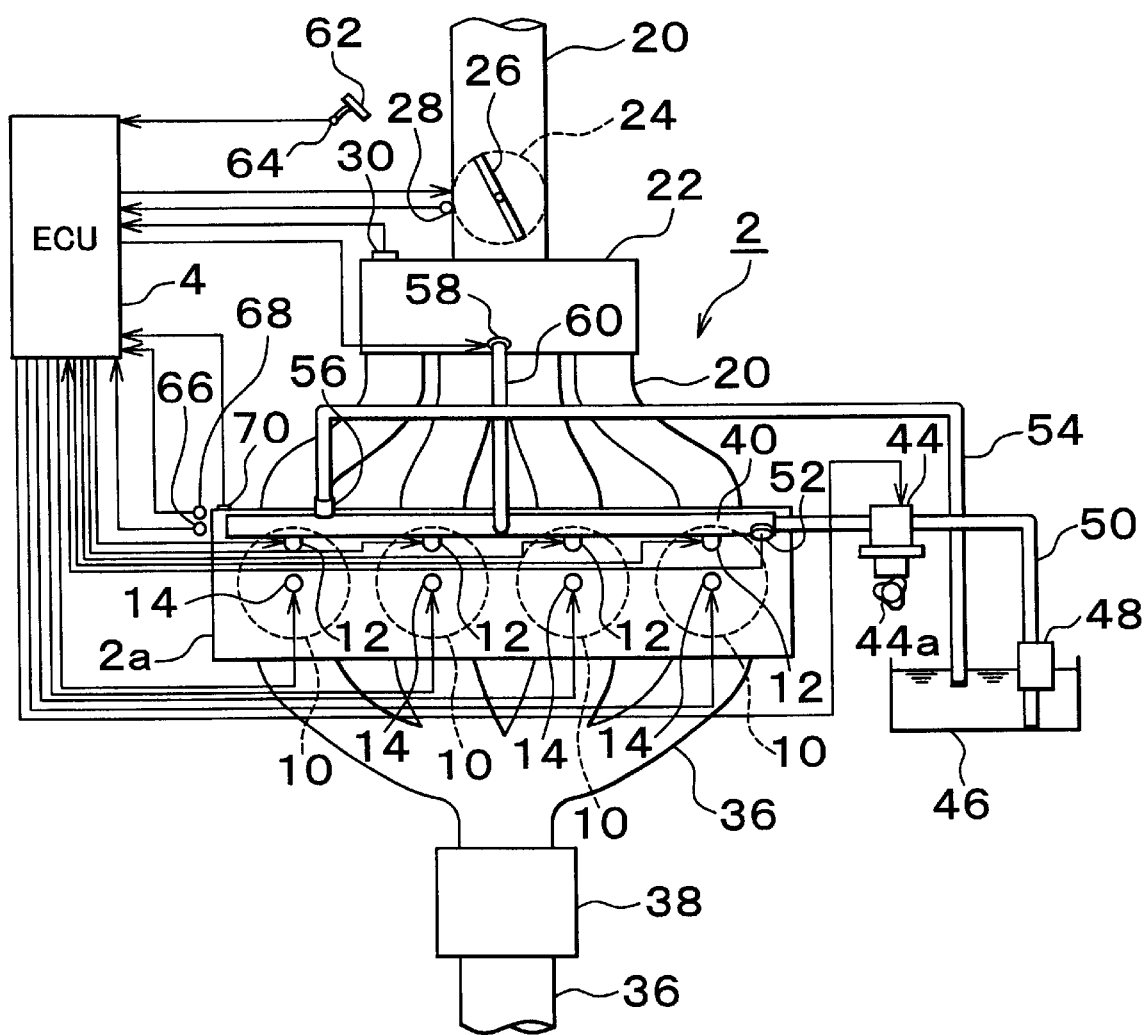
FIG. 1 is a schematic view showing a gasoline engine and an ECU according to a first embodiment.

FIG. 1 shows a schematic configuration of a cylinder injection type gasoline engine 2 (hereinafter engine 2) mounted on a vehicle and its electronic control unit 4 (controller) (hereinafter ECU 4). Output of the engine 2 is transmitted to wheels (not shown) of a vehicle as a driving force that travels through a transmission (not shown). Main fuel injection valves 12 for directly injecting a fuel and ignition plugs 14 for igniting the injected fuel are provided in combustion chambers 10 of the engine 2. Intake ports (not shown), connected to the combustion chambers 10, are opened and closed by the movement of intake valves (not shown). A surge tank 22 is provided at a point midway of an intake channel 20 connected to the intake ports. A throttle valve 26, whose opening is adjusted by a throttle motor 24, is provided upstream of the surge tank 22. An intake quantity is adjusted by the opening (throttle opening TA) of the throttle valve 26. The throttle opening TA is detected by a throttle opening sensor 28, and an intake pressure PM in the surge tank 22 is detected by an intake pressure sensor 30 provided at the surge tank 22. The ECU 4 receives the detected inputs from both the throttle opening TA and the intake pressure PM.

Exhaust ports (not shown), connected to the combustion chambers 10, are opened and closed by the movement of exhaust valves (not shown). An exhaust emission-purifying catalyst 38, such as a three way catalyst or an NOx absorbing/deoxidizing catalyst, is provided at a point midway of an exhaust channel 36 connected to the exhaust ports.

The main fuel injection valves 12 are connected to a delivery pipe 40 comprising a high-pressure fuel channel, and are supplied with a high-pressure fuel from the delivery pipe 40. The delivery pipe 40 is supplied with the high-pressure fuel from a high-pressure fuel pump 44. The high-pressure pump 44 is supplied with a low-pressure fuel from a feed pump 48, which has drawn the fuel from a fuel tank 46, through a low-pressure fuel channel 50. The high-pressure pump 44 is driven by revolution of a pump cam 44a interlocking with an intake camshaft (not shown) of the engine 2. The high-pressure pump 44 pressurizes the low-pressure fuel and discharges it as the high-pressure fuel to the delivery pipe 40. In the high-pressure pump 44, quantities of suction and discharge of the respective low-pressure fuel and high-pressure fuel are adjusted by opening and closing of a built-in valve controlled by the ECU 4. The ECU 4 adjusts a quantity of fuel supply to the delivery pipe 40 from the high-pressure pump 44 so that a fuel pressure Pf, detected by a fuel pressure sensor 52 provided at the delivery pipe 40, becomes a target fuel pressure according to a running status of the engine.

Meanwhile, if the fuel pressure in the delivery pipe 40 becomes excessively high as a result of an excess fuel supply, a relief valve 56, provided at a return pipe 54, is opened to discharge the fuel to the fuel tank 46 thereby lowering the fuel pressure.

The surge tank 22 is provided with an auxiliary fuel injection valve 58 to which an auxiliary fuel supplying channel 60 introducing the high-pressure fuel from the delivery pipe 40 is connected. Therefore, the ECU 4 is capable of injecting the fuel in the delivery pipe 40 into the surge tank 22 through the auxiliary fuel injection valve 58 as desired. An engine body 2a is illustrated as a plan view in FIG. 1. As shown, the delivery pipe 40 extends in parallel to the arrangement direction of the combustion chambers 10. On the other hand, the auxiliary fuel supplying channel 60 forms a supply opening, on the upper portion of and around the middle of the length direction of the delivery pipe 40, to introduce the high-pressure fuel into the auxiliary fuel injection valve 58.

The ECU 4 is an engine control circuit comprising a digital computer. The ECU 4 inputs signals from an accelerator opening sensor 64 for detecting a pedaling degree (accelerator opening ACCP) of an accelerator pedal 62, an engine revolution sensor 66 for detecting an engine revolution NE from rotation of a crankshaft (not shown), a standard crank angle sensor 68 for determining a standard crank angle from rotation of the intake camshaft (not shown), and a water coolant temperature sensor 70 for detecting an engine water coolant temperature THW in addition to the throttle opening sensor 28, the intake pressure sensor 30, and the fuel pressure sensor 52. Furthermore, an air-fuel ratio sensor (not shown) for detecting an air-fuel ratio of air-fuel mixture from composition of exhaust gas in the exhaust channel 36, as well as other sensors are provided as desired.

The ECU 4 controls fuel injection timing of the engine 2, a fuel injection quantity, and the throttle opening according to detection results from the sensors described above. The ECU 4 switches a combustion mode from stratified charge combustion to uniform charge combustion, and vice versa. In the present exemplary embodiment, the combustion mode is determined according to a map between the engine revolution NE and a load factor eklq under normal running conditions, except cold conditions. The load factor eklq indicates a ratio of present load to maximum engine load according to the accelerator opening ACCP and the engine revolution NE. The load factor eklq, for example, can be calculated from a map whose parameters are the accelerator opening ACCP and the engine revolution NE. Meanwhile, the engine 2 may be a cylinder injection type internal combustion engine whose combustion mode is only the uniform charge combustion not the stratified charge combustion.

Figure 2:
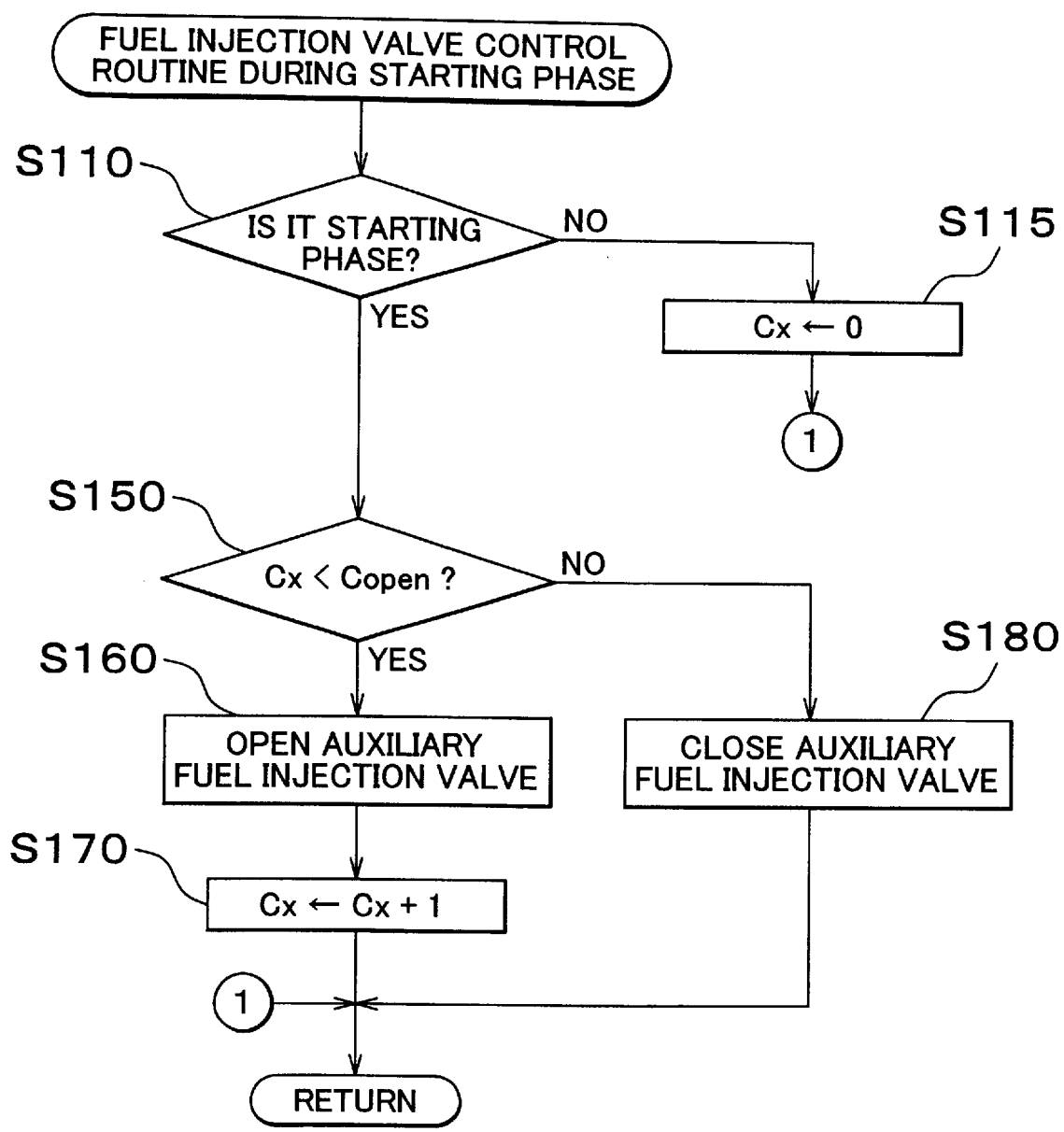
FIG. 2 is a flow chart showing a fuel injection valve control routine during starting phase according to the first embodiment.

The following description explains the fuel injection valve control routine during starting phase among the controls preformed by the ECU 4. The flow chart of the present routine is shown in FIG. 2. The present routine is repeated in a short cycle after an ignition key is tuned to "ON" position.

When the routine is initiated, whether or not the engine is in a starting phase is determined (step S110). The ECU 4 determines the engine is in the starting phase if, for example, the engine revolution NE detected by the engine revolution sensor 66 is smaller than a starting determination standard revolution (e.g., 400 rpm). If the ECU 4 determines that the engine is not in the starting phase ("NO" at step S110), the ECU 4 sets a timer counter Cx to "0" (step S115), and terminates the routine. If the engine is not in the starting phase as described above (in other words, if the starting phase of the engine has been completed), the fuel injection quantity of the main fuel injection valves 12 is determined according to the accelerator opening ACCP through a fuel injection quantity control, performed separately, after completion of the starting phase.

On the other hand, if the ECU 4 determines that the engine is in the starting phase ("YES" at step S110), the ECU 4 determines whether the timer counter Cx is shorter than a standard valve opening time Copen (step S150). The standard valve opening time Copen is a value set in consideration of a time desired to discharge vapor generated in the delivery pipe 40 upon starting after high-temperature soaking, and is used to determine time to keep the auxiliary fuel injection valve 58 open. The standard valve opening time Copen may be a constant value, or may be set so that it becomes longer as the engine water coolant temperature THW drops to lower values.

Figure 3:
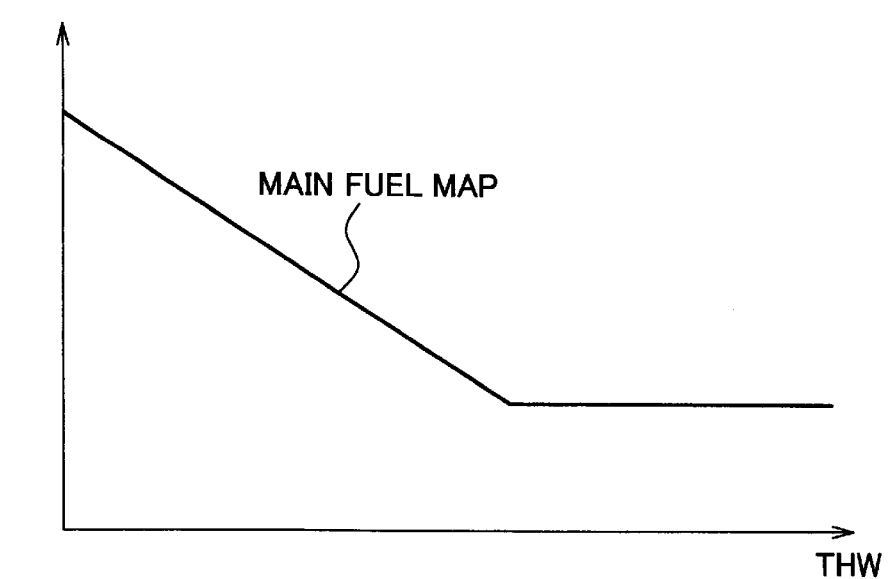
FIG. 3 is an explanatory drawing showing maps of quantities of a main fuel and an auxiliary fuel for calculating a fuel injection quantity during a starting phase.

The Cx has been set to "0" through initial setting upon starting the engine or at step S115. Therefore, initially, the determination at step S150 is "YES". Next, the auxiliary fuel injection valve 58 is opened (step S160), and a value of the timer counter Cx is increased incrementally (step S170). Then, the present routine is terminated. Meanwhile, if the engine is in the starting phase, a quantity of main fuel injection QINJST is calculated from the engine water coolant temperature THW of the map shown in FIG. 3 through the fuel injection quantity control, performed separately, upon starting phase.

Hereafter, the value of the timer counter Cx continues to be increased incrementally (step S170). As long as the Cx is shorter than the Copen ("YES" at step S150), the auxiliary fuel injection valve 58 continues to be open (step S160). In the meantime, the vapor in the delivery pipe 40 is completely discharged into the surge tank 22 from the auxiliary fuel injection valve 58 through the auxiliary fuel supplying channel 60.

Then, if the Cx becomes equal to the Copen ("NO" at step S150), the auxiliary fuel injection valve 58 is closed (step S180), and the present routine is terminated.

Hereafter, if the starting phase is continuing, the injection control according to the quantity of main fuel injection QINJST, performed by opening the main fuel injection valves 12, continues, and the auxiliary fuel injection valve 58 is kept closed. Then, if the starting phase has been completed, the determination at step S110 changes to "NO", so that only step S115 for setting the timer counter Cx to "0" is performed, virtually terminating the fuel injection valve control routine during starting phase (show in FIG. 2).

Figure 4:
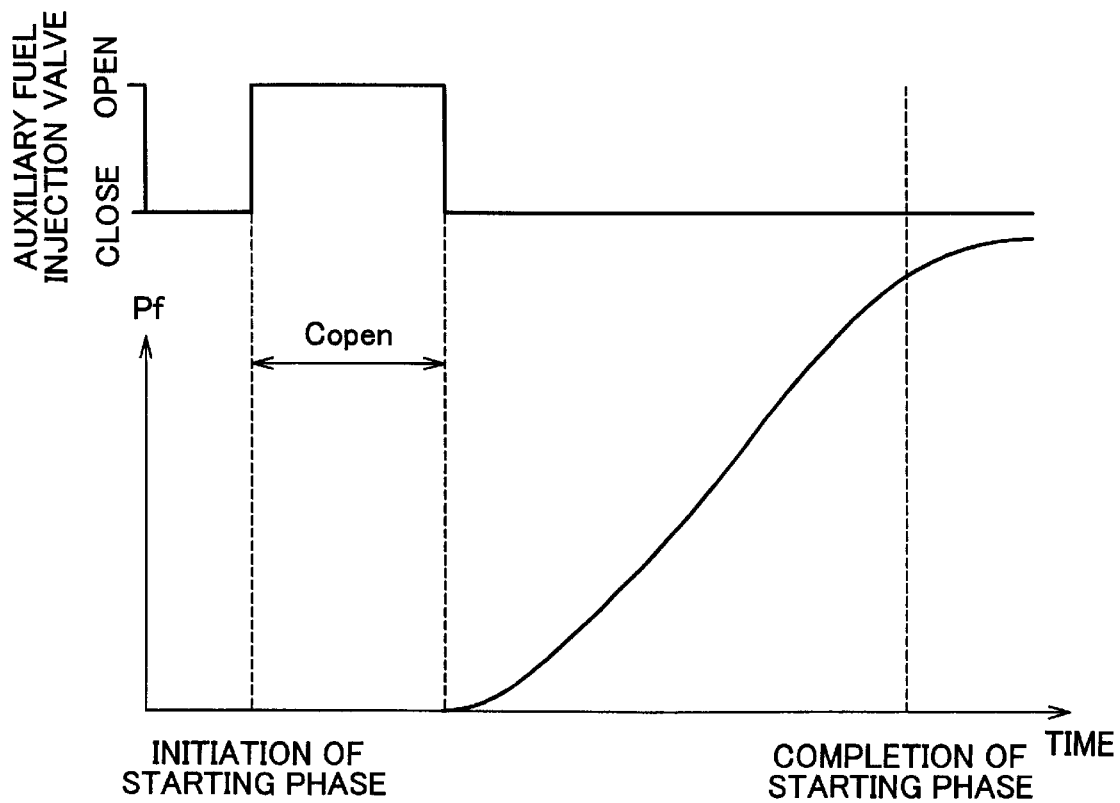
FIG. 4 is a timing chart showing an example control according to the first embodiment.
Figure 5:
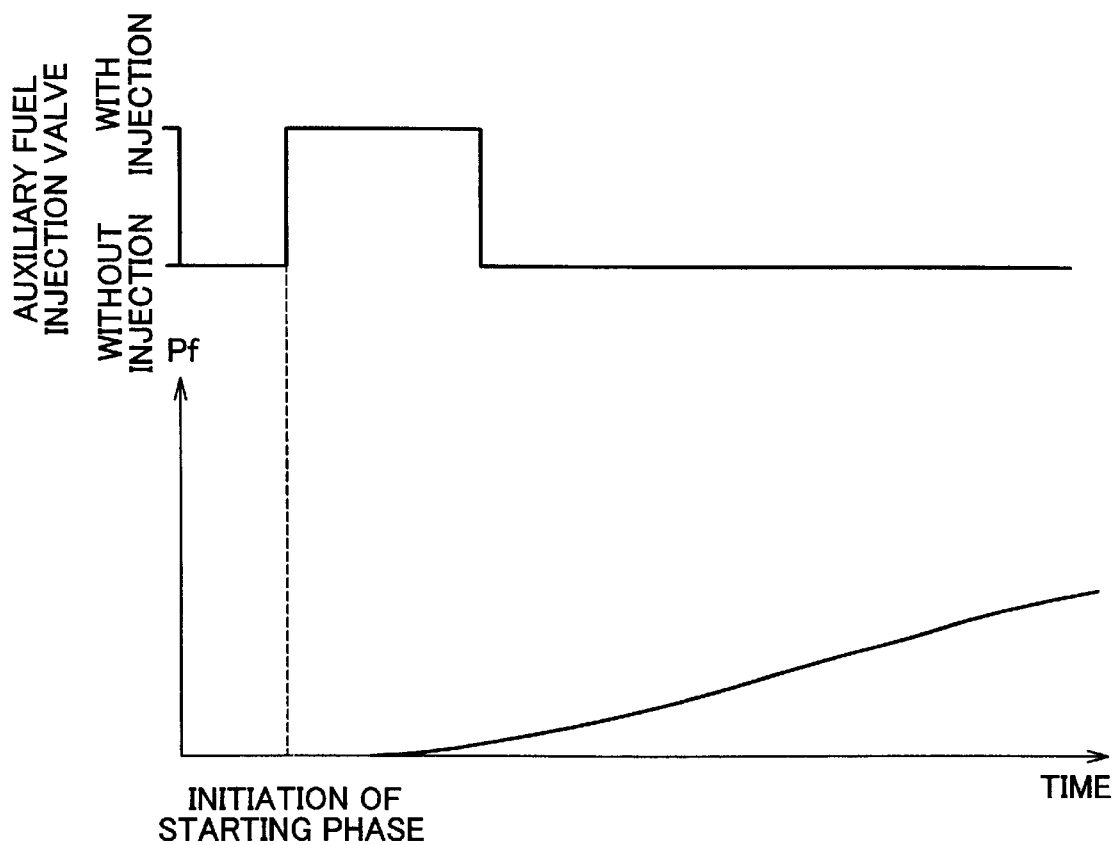
FIG. 5 is a timing chart showing an example control according to the related art.

FIG. 4 is a timing chart showing an example control according to the present exemplary embodiment. FIG. 5 is a timing chart showing an example control according to the related art by which a low-pressure fuel, supplied from a feed pump, is introduced into an auxiliary fuel injection valve to inject the low-pressure fuel.

As shown in FIG. 4 of the exemplary embodiment, the auxiliary fuel injection valve 58 is open for the standard valve opening time Copen in the beginning of the starting phase, and the vapor, generated in the starting phase in the delivery pipe 40, is discharged. This in turn rapidly increases the fuel pressure Pf, and allows the atomization of the fuel injected from the main fuel injection valves 12 to become sufficient. As a result, starting performance improves.

To the contrary, according to the related art, the auxiliary fuel supplying channel 60 is not connected to the delivery pipe 40 and the vapor cannot be discharged from a delivery pipe even if an auxiliary fuel injection valve is opened in the beginning of the starting phase. As a result, as shown in FIG. 5, an increase in the fuel pressure Pf slows down in the starting phase when the vapor is generated in the delivery pipe.

In step S110 and steps S150 through S180, increasing pressure of the fuel by the high-pressure fuel pump can be assisted by discharging the vapor from the high-pressure fuel channel through an opening valve control of the auxiliary fuel injection valve 58.

According to the first exemplary embodiment described above, the following effects can be achieved.

(A) The auxiliary fuel injection valve 58 is supplied with the high-pressure fuel from the delivery pipe 40. With this configuration, the fuel can be injected into sucked air flowing in the surge tank 22 under cold conditions. In addition, the vapor in the delivery pipe can be discharged by temporary opening the auxiliary fuel injection valve 58 in the starting phase. For example, the vapor can be discharged from the delivery pipe 40 without providing a special apparatus at the delivery pipe 40.

As a result, by performing the fuel injection valve control routine during starting phase shown in FIG. 2, the fuel pressure Pf can rapidly be increased in the starting phase, and the atomization of the fuel injected from the main fuel injection valves 12 becomes quickly desirable, improving the starting performance.

(B) The auxiliary fuel supplying channel 60 is provided on the upper portion of the delivery pipe 40, and the vapor mainly generates in the upper interior part of the delivery pipe 40. Therefore, the vapor can be discharged from the delivery pipe 40 more securely and rapidly by injecting the fuel from the auxiliary fuel injection valve 58, so that the fuel pressure Pf can be increased more rapidly.

Figure 6:
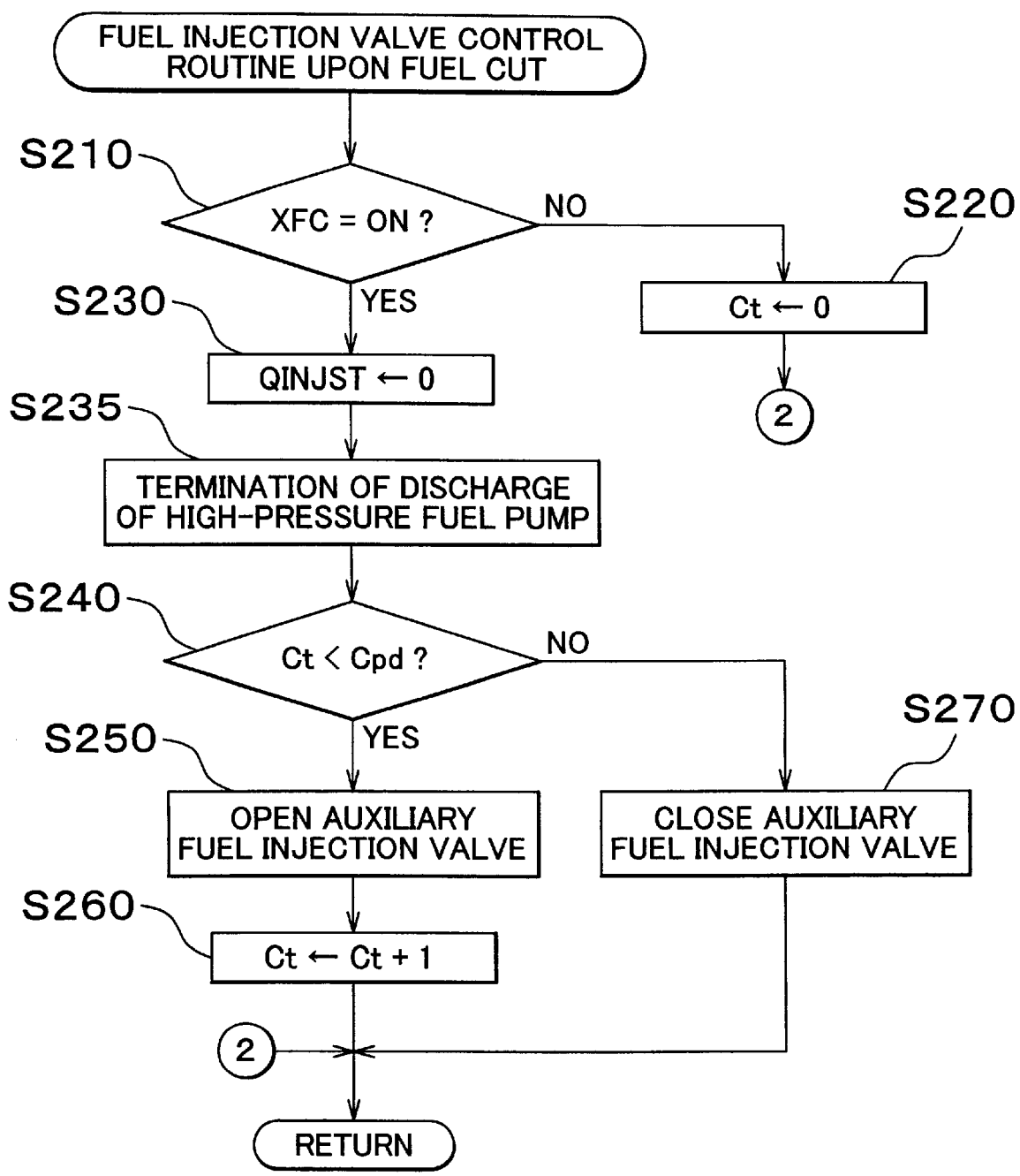
FIG. 6 is a flow chart showing a fuel injection valve control routine upon fuel cut according to a second embodiment.

The second exemplary embodiment is different from the first one in performing the fuel injection valve control routine upon fuel cut, shown in FIG. 6, as a fuel cut control of the main fuel injection valves 12 when the engine 2 is decelerating.

The following explains the fuel injection valve control routine upon fuel cut shown in FIG. 6. The present routine is repeated by the ECU 4 in a short cycle. When the present routine is initiated, first of all, whether a fuel cut flag XFC is "ON" or not is determined (step S210). The fuel cut flag XFC is set to "ON" if the following two conditions are met in a fuel cut determination routine performed by the ECU 4. The first condition is that the accelerator opening ACCP, detected by the accelerator opening sensor 64, becomes "0" when the accelerator pedal 62 is released. The second condition is that the engine revolution NE is larger than a return standard revolution determining whether to resume fuel injection. The fuel cut flag XFC is set at "OFF" under the other conditions.

If the XFC is "OFF" ("NO" at step S210), a timer counter Ct is set to "0" (step S220), and the present routine is terminated. At this time, the fuel injection quantity control, in which the fuel with the quantity of main fuel injection QINJST, set according to running status of the engine, is injected from the main fuel injection valves 12, is separately performed.

On the other hand, if the XFC becomes "ON" ("YES" at step S210) because a driver has completely released the accelerator pedal 62 during travel, the quantity of main fuel injection QINJST is set to "0" (step S230). This terminates fuel injection into the combustion chambers 10 from the main fuel injection valves 12.

Then, driving a valve in the high-pressure pump 44 is terminated to terminate discharging the fuel into the delivery pipe 40 from the high-pressure pump 44 (step S235).

Next, whether or not the timer counter Ct is shorter than a standard valve opening time Cpd is determined (step S240). The Ct has been set to "0" through initial setting upon starting the engine or at step S220. Initially, the Ct is shorter the Cpd ("YES" at step S240), which opens the auxiliary fuel injection valve 58 (step S250). Then, the timer counter Ct is increased incrementally (step S260), and the present routine is terminated.

Hereafter, incremental increase of the timer counter Ct is repeated, and the auxiliary fuel injection valve 58 continues to be open as long as the XFC is "ON" and the Ct is shorter than the Cpd ("YES" at step S240). When the Ct becomes equal to the Cpd ("NO" at step S240), the auxiliary fuel injection valve 58 is closed (step S270).

Hereafter, the quantity of main fuel injection QINJST remains to be "0" (step S230), termination of discharging the fuel from the high-pressure pump 44 (step S235) continues, and the auxiliary fuel injection valve 58 is kept closed (step S270) as long as the XFC is "ON" ("YES" at step S210).

If the XFC becomes "OFF" ("NO" at step S210) because the driver has depressed the accelerator pedal 62 or because the engine revolution NE has decreased to the return standard revolution, the timer counter Ct is set back to "0" (step S220) and the present routine is terminated. As explained before, the processes at steps S230 and S235 are not performed if the XFC is "OFF". As a result, the quantity of main fuel injection QINJST is set according to running status of the engine to resume fuel injection from the main fuel injection valves 12. In addition, the high-pressure pump 44 is driven to achieve the target fuel pressure according to running status of the engine. Meanwhile, this resumption may return from fuel cut, for example, the main fuel injection valves 12 starts to inject the fuel into each combustion chambers after fuel cut, when the combustion mode is stratified charge combustion. Therefore, to prevent shocks, the ECU 4 temporarily performs a process to reduce the fuel injection quantity.

Figure 7:
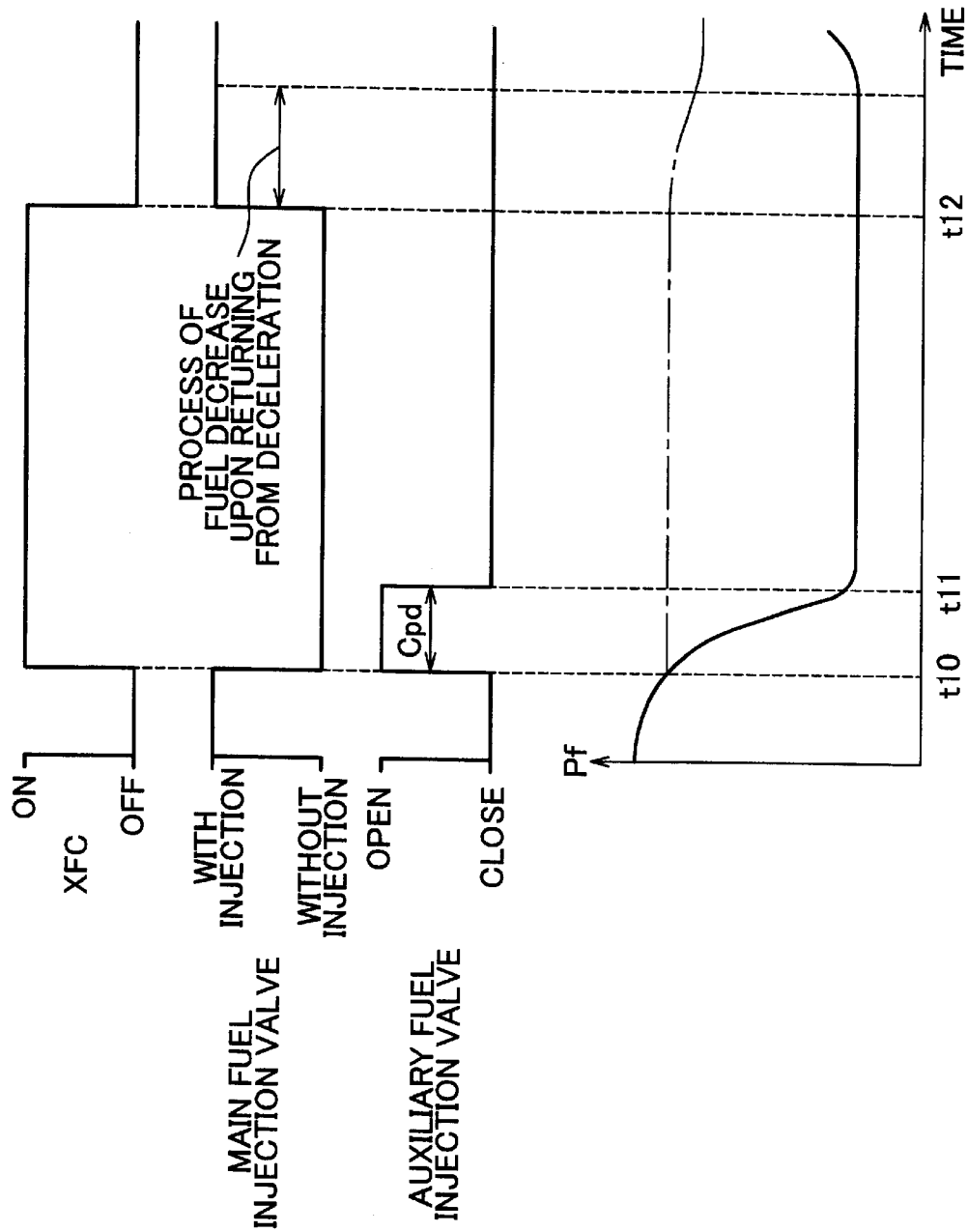
FIG. 7 is a timing chart showing an example control according to the second embodiment.

FIG. 7 is a timing chart showing an example control according to the present exemplary embodiment. When the fuel cut flag XFC is switched from "OFF" to "ON" at time t10, fuel injection from the main fuel injection valves 12 is terminated. Then, the auxiliary fuel injection valve 58 is kept open during the standard valve opening time Cpd starting from the time t10 to time t11. By temporarily keeping the auxiliary fuel injection valve 58 open as mentioned above, the fuel is injected into the surge tank 22 from the auxiliary fuel injection valve 58 so that combustion in the engine 2 is slightly extended. On the other hand, the fuel pressure Pf in the delivery pipe 40 is rapidly decreased. Therefore, the fuel pressure Pf has been sufficiently decreased when fuel injection from the main fuel injection valves 12 is resumed at time t12.

In step S210 and steps S240 through S270 of the fuel injection valve control routine upon fuel cut, shown in FIG. 6, an injection of a small quantity of fuel is possible by assistance to decreasing a pressure of the high-pressure fuel upon fuel cut of the main fuel injection valves 12 to realize depressurization of an injection pressure immediately after returning, preventing shocks when returning from the fuel cut. The shocks are more severe if fuel injection from the main fuel injection valves 12 is resumed when the combustion mode is stratified charge combustion. Therefore, an effect of preventing the shocks becomes more significant in this case.

According to the second exemplary embodiment described above, the following effects can be achieved.

(A) When the XFC becomes "ON", it in turn will become "OFF". Therefore, the auxiliary fuel injection valve 58 is opened immediately after fuel injection from the main fuel infection valves 12 is terminated, because of the "ON" status of the XFC. As a result, the fuel in the delivery pipe 40 is discharged into the surge tank 22, and the fuel pressure in the delivery pipe 40 is decreased. Therefore, when the XFC is switched to "OFF" from "ON", the fuel injection pressure of the main fuel injection valves 12 has been sufficiently low, so that the injection of the small quantity of fuel can be realized from the initiation of fuel injection from the main fuel injection valves 12 without restriction by minimum injection time. Thus, the shocks produced upon returning from deceleration can be prevented. For example, the fuel pressure in the delivery pipe 40 can sufficiently be kept low before fuel injection from the main fuel injection valves 12 is resumed, enabling the required small quantity of fuel injection.

If the process of opening the auxiliary fuel injection valve 58 is not performed, as the chain line shows in FIG. 7, fuel injection from the main fuel injection valves 12 is resumed with the fuel pressure maintained from termination of fuel injection from the main fuel injection valves 12 at time t10. This make it undesirable to inject the small quantity of fuel, because of the restriction by the minimum injection time, so that the shocks upon returning from deceleration cannot be prevented.

Although the auxiliary fuel injection valve 58 is opened immediately after the fuel cut of the main fuel injection valves 12 according to the second exemplary embodiment, the auxiliary fuel injection valve 58 may be opened, for example, during the fuel cut of the main fuel injection valves 12. The fuel pressure in the high-pressure fuel channel can sufficiently be decreased when fuel injection from the main fuel injection valves 12 is resumed, enabling the injection of the required small quantity of fuel. Furthermore, the auxiliary fuel injection valve 58 may be opened shortly before the fuel cut of the main fuel injection valves 12.

Figure 8:
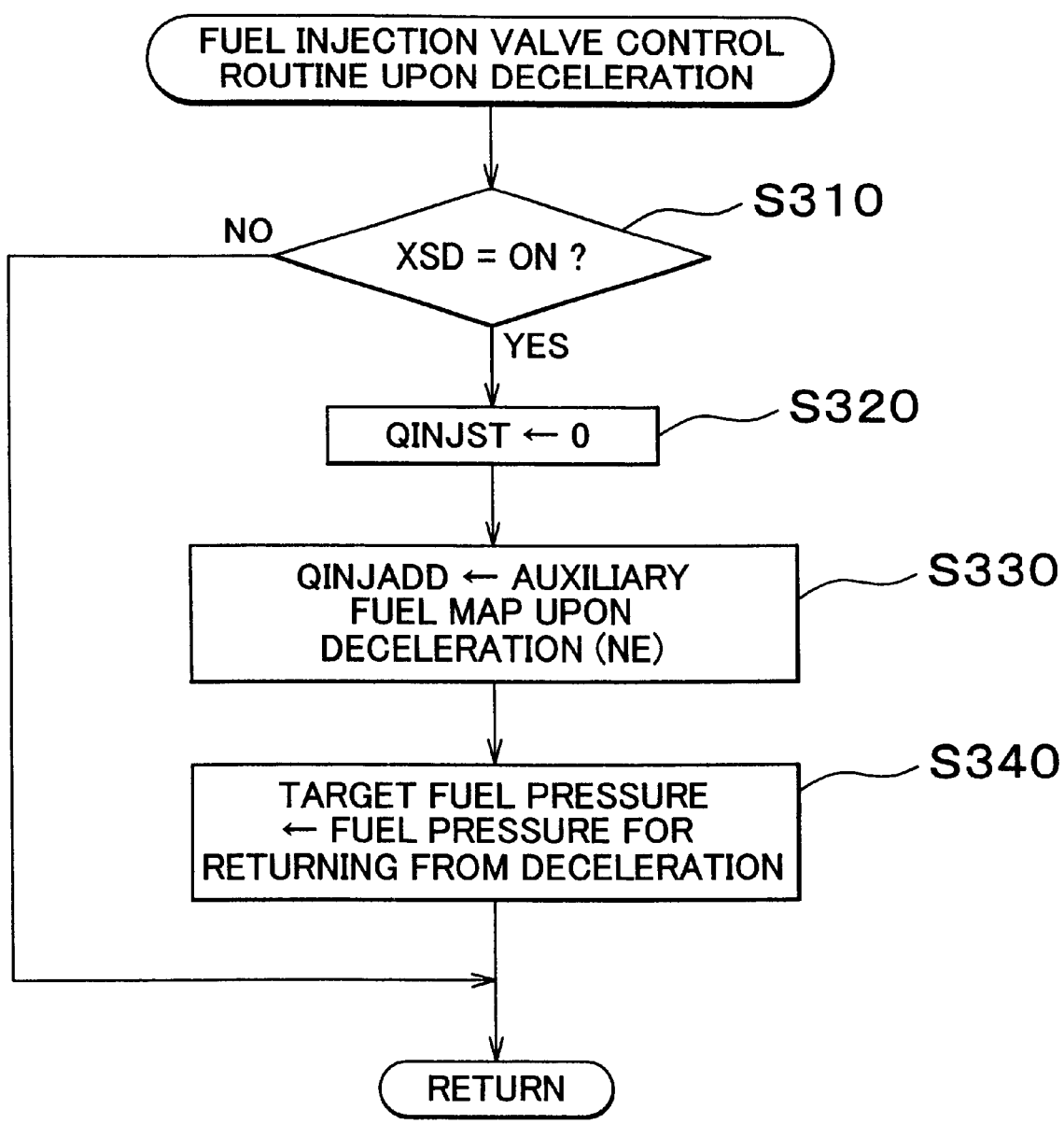
FIG. 8 is a flow chart showing a fuel injection valve control routine upon deceleration according to a third embodiment.

The third exemplary embodiment is different from the first exemplary embodiment in performing the fuel injection valve control routine upon deceleration shown in FIG. 8.

According to FIG. 8, the present routine is repeated by the ECU 4 in a cycle of 180° CA (crank angle). When the present routine is first initiated, whether or not a slow down flag XSD is "ON" is determined (step S310). The slow down flag XSD is set at "ON" or "OFF" under the same conditions under which the fuel cut flag XFC is set to "ON" or "OFF", explained in the second embodiment. In other words, the slow down flag XSD is set to "ON" when the accelerator opening ACCP is 0° and the engine revolution NE is larger than the return standard revolution, and is set to "OFF" under the other conditions.

If the XSD is "OFF" ("NO" at step S310), the present routine is terminated. In this case, the fuel injection quantity control, in which the fuel with the quantity of main fuel injection QINJST, set according to running status of the engine, is injected from the main fuel injection valves 12, is separately performed.

On the other hand, if the XSD becomes "ON" ("YES" at step S310) because a driver has completely released the accelerator pedal 62 during travel, the quantity of main fuel injection QINJST is set to "0" (step S320). This terminates fuel injection into the combustion chambers 10 from the main fuel injection valves 12.

Then, an auxiliary fuel injection quantity QINJADD is calculated according to the engine revolution NE of an auxiliary fuel map upon deceleration (step S330). If fuel injection is completely terminated when the engine is decelerating, the exhaust emission-purifying catalyst 38, such as the NOx absorbing/deoxidizing catalyst, may deteriorate because of an excessive supply of oxygen. Therefore, auxiliary fuel injection quantity QINJADD is set from the auxiliary fuel map upon deceleration so that the fuel is injected from the auxiliary fuel injection valve 58 to prevent the exhaust emission-purifying catalyst 38 from deteriorating.

Next, the target fuel pressure is set to a fuel pressure for returning from deceleration (step S340), and the present routine is terminated. The fuel pressure for returning from deceleration, as explained in the second exemplary embodiment, is set so that the fuel injection quantity of the main fuel injection valves 12 can sufficiently be adjusted to be small enough to prevent the shocks produced upon initiation of stratified charge combustion after returning from deceleration. In addition, the fuel pressure for returning from deceleration is set to a low value so that the required small quantity of fuel injection can be realized without the restriction by the minimum injection time.

Meanwhile, the fuel pressure in the delivery pipe 40 is high, and the auxiliary fuel injection valve 58, as a single valve, supplies the fuel into four cylinders immediately after the XSD is switched from "OFF" to "ON". Therefore, an injection time is four times longer than that to inject the fuel to a single cylinder (for example, six times longer for six cylinders and eight times longer for eight cylinders), so that the fuel injection quantity can be prevented from becoming excessive without the restriction by the minimum injection time of the auxiliary fuel injection valve 58.

For example, although a fuel quantity necessary for preventing the catalyst from deteriorating is small, the auxiliary fuel injection valve 58 injects a larger quantity of the fuel into plural cylinders. Therefore, the injection time of the auxiliary fuel injection valve 58 is directly proportional to the number of cylinders. As a result, the fuel injection quantity can be prevented from becoming excessive, because the fuel injection time is not shortened to such an extent that it is restricted by the minimum injection time of the auxiliary fuel injection valve 58 even if the fuel pressure is high in the beginning of fuel injection from the auxiliary fuel injection valve 58.

As described above, the small quantity of fuel injection from the auxiliary fuel injection valve 58 continues when the XSD is "ON". Then, if the XSD becomes "OFF" ("NO" at step S310) because the driver has depressed the accelerator pedal 62, or because the engine revolution NE has decreased to the return standard revolution, the present routine is terminated. The processes at steps S320 through S340 are not performed if the XSD is "OFF", so that fuel injection from the auxiliary fuel injection valve 58 is terminated. As a result, the target fuel pressure and the quantity of main fuel injection QINJST are set according to the running status of the engine to resume fuel injection from the main fuel injection valves 12. Meanwhile, this resumption may return from the fuel cut when the combustion mode is stratified charge combustion. Therefore, to prevent the shocks produced, the ECU 4 temporarily performs the process to reduce the fuel.

Figure 9:
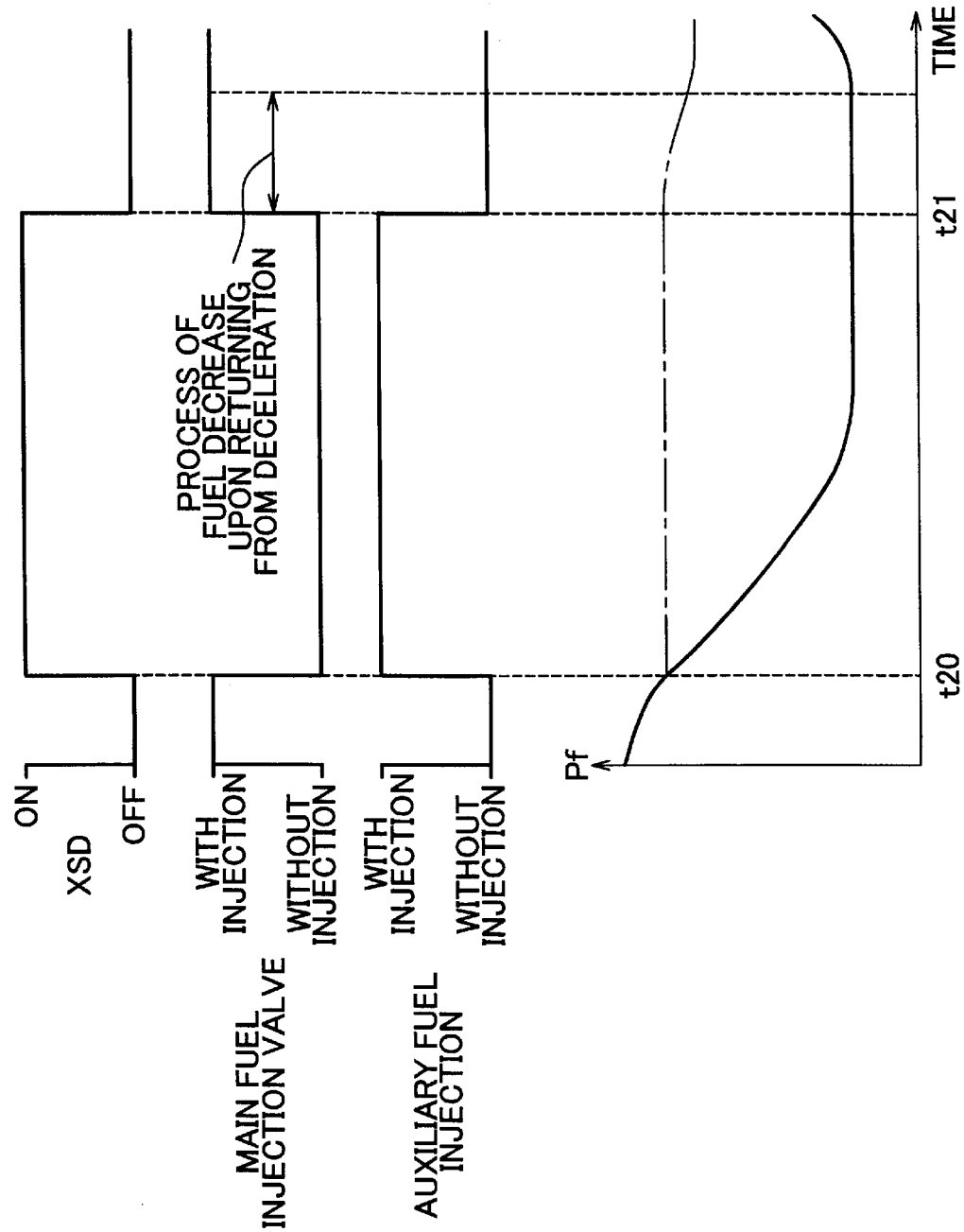
FIG. 9 is a timing chart showing an example control according to the third embodiment.

FIG. 9 is a timing chart showing an example control according to the present exemplary embodiment. When the slow down flag XSD is switched from "OFF" to "ON" at time t20, fuel injection from the main fuel injection valves 12 is terminated, and the injection at the small quantity of fuel from the auxiliary fuel injection valve 58 is carried out. In addition, the fuel pressure Pf is adjusted to sufficiently low.

When the slow down flag XSD is switched from "ON" to "OFF" at time t21, fuel injection from the main fuel injection valves 12 is resumed, and fuel injection from the auxiliary fuel injection valve 58 is terminated. Meanwhile, the small quantity of the fuel is injected from the main fuel injection valves 12 in the beginning of the fuel injection, as mentioned previously. However, the fuel pressure has already been lowered at this time, so that the small quantity of fuel injection enabling sufficient shock prevention can be realized.

If the process of fuel injection from the auxiliary fuel injection valve 58 is not performed, as the chain line shows in FIG. 9, fuel injection from the main fuel injection valves 12 is resumed with the fuel pressure maintained from termination of fuel injection from the main fuel injection valves 12 at time t20. This make it impossible to inject the small quantity of fuel, because of the restriction by the minimum injection time, so that the shocks produced upon returning from deceleration cannot be prevented.

At steps S310, S330, and S340 of the fuel injection valve control routine upon deceleration, shown in FIG. 8, the catalyst can be prevented from deteriorating by performing the fuel injection control of the auxiliary fuel injection valve 58 during the fuel cut of the main fuel injection valves 12. In other words, deterioration of the exhaust emission-purifying catalyst, provided at the exhaust channel, may progress if the fuel is not completely supplied during the fuel cut of the main fuel injection valves 12 and during exhaust. Therefore, the processes of preventing the catalyst from deteriorating and of decreasing the fuel pressure in the high-pressure channel are performed in the third exemplary embodiment.

According to the third exemplary embodiment described above, the following effects can be achieved.

(A) As mentioned above, both the processes of preventing the catalyst from deteriorating and of decreasing the fuel pressure in the delivery pipe 40 can be performed during the fuel cut of the main fuel injection valves 12. Therefore, both effects of protecting the catalyst and of preventing the shocks produced upon returning from the fuel cut can be achieved. Furthermore, the auxiliary fuel injection valve 58 is provided at the surge tank 22, so that the fuel injection time is not shortened to such an extent that it is restricted by the minimum injection time of the auxiliary fuel injection valve 58, even if the fuel pressure is high in the beginning of the fuel injection from the auxiliary fuel injection valve 58. This prevents the fuel injection quantity of the auxiliary fuel injection valve 58 from becoming excessive, and improves mileage.

Figure 10:
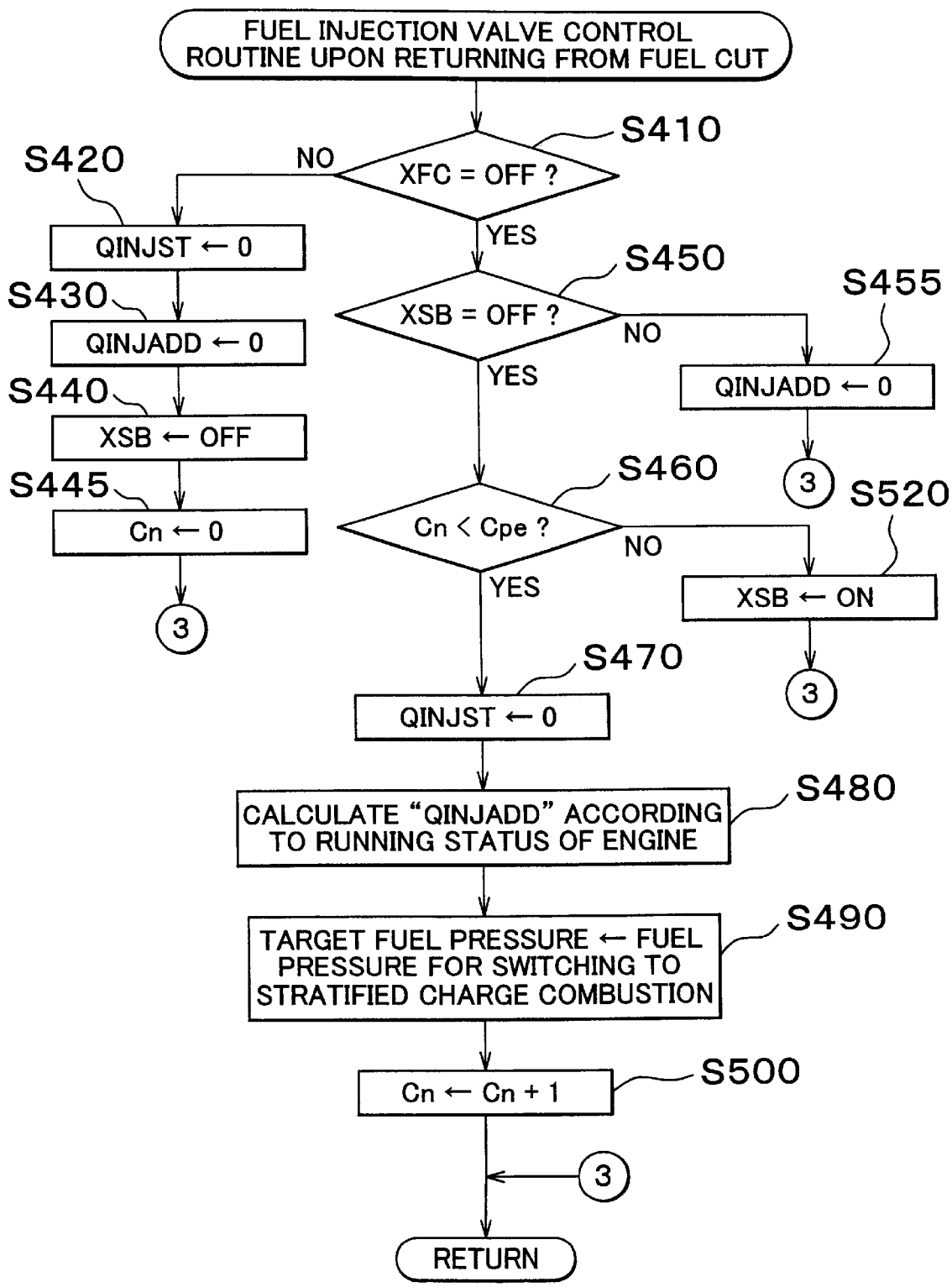
FIG. 10 is a flow chart showing a fuel injection valve control routine upon returning from fuel cut according to a fourth embodiment.

The fourth exemplary embodiment is different from the first one in performing the fuel injection valve control routine upon returning from fuel cut shown in FIG. 10.

The following description explains the fuel injection valve control routine upon returning from fuel cut shown in FIG. 10. The present routine is repeated by the ECU 4 in a cycle of 180° CA (crank angle). When the present routine is first initiated, whether or not the fuel cut flag XFC is "OFF" is determined (step S410). The fuel cut flag XFC is set as explained in the second exemplary embodiment.

If the XFC is "OFF" ("YES" at step S410), whether or not an auxiliary fuel injection completion flag upon returning from fuel cut XSB is "OFF" (step S450) is determined. The auxiliary fuel injection completion flag upon returning from fuel cut XSB has been set to "ON" through the initial setting upon starting the engine or at step S520 later explained. Therefore, the auxiliary fuel injection completion flag upon returning from fuel cut XSB is "ON" initially ("NO" at step S450), so that an auxiliary fuel injection quantity QINJADD is set to "0" (step S455), and the present routine is terminated. When the XFC is "OFF" and the XSB is "ON", as described above, the fuel with a quantity according to the running status of the engine is injected from the main fuel injection valves 12 through the fuel injection control separately performed by the ECU 4.

On the other hand, if the XFC becomes "ON" ("NO" at step S410) because the driver has completely released the accelerator pedal 62 during travel, the quantity of main fuel injection QINJST is set to "0" (step S420), and the auxiliary fuel injection quantity QINJADD is set to "0" (step S430). This terminates the fuel injection from both the main fuel injection valves 12 and the auxiliary fuel injection valve 58.

Then the auxiliary fuel injection completion flag upon returning from fuel cut XSB is set to "OFF" (step S440), followed by setting a counter Cn to "0" (step S445), before terminating the present routine. Hereafter, the fuel cut continues by performing the processes at steps S420 through S440 as long as the XFC is "ON" (step S410).

If the XFC becomes "OFF" ("NO" at step S410) because the driver has depressed the accelerator pedal 62, or because the engine revolution NE has decreased to the return standard revolution, then whether or not the XSB is "OFF" is determined (step S450). The XSB has been set at "OFF" at step S440 until the previous control cycle so that the determination at step 450 is "YES". Then, whether or not the counter Cn is smaller than a standard number of auxiliary fuel injection control Cpe is determined (step S460). Initially, the Cn is "0", so that the Cn is smaller than the Cpe ("YES" at step S460). Therefore, the main fuel injection quantity QINJST is set to "0" (step S470). Then the auxiliary fuel injection quantity QINJADD is set to a value so that a stoichiometric air fuel ratio according to running status of the engine can be gained (step S480). This causes the engine 2 to return from deceleration when the combustion mode is a uniform charge combustion.

The target fuel pressure is set to a fuel pressure for switching to stratified charge combustion (step S490). Considering that the combustion mode may shift to stratified charge combustion by the main fuel injection valves 12 hereafter, it is necessary to temporarily adjust the fuel injection quantity of the main fuel injection valves 12 to be smaller in the beginning of stratified charge combustion to prevent the shocks generated in the internal combustion engine at the shift of the combustion mode. To ensure that the fuel injection quantity can be decreased to a desirable one without the restriction by the minimum injection time of the main fuel injection valves 12, the fuel pressure in the delivery pipe 40 is decreased in advance when the combustion mode is the uniform charge combustion by setting the target fuel pressure to a sufficiently small fuel pressure for switching to stratified charge combustion.

The counter Cn is increased incrementally (step S500), and the present routine is terminated. The XFC is "OFF" ("YES" at step S410) and the XSB is "OFF" ("YES" at step S450) in the next control cycle, so that whether the Cn is smaller than the Cpe or not is redetermined at step S460. If the Cn is still smaller than the Cpe ("YES" at step S460), the processes at steps S470 through S500 are performed, and the uniform charge combustion by the fuel injected only from the auxiliary fuel injection valve 58 continues at the stoichiometric air fuel ratio.

The uniform charge combustion by the fuel injection only from the auxiliary fuel injection valve 58 continues as long as the XFC is "OFF", the XSB is "OFF", and the Cn is smaller than the Cpe ("YES" at step S410, "YES" at step S450, and "YES" at step S460). As a result, the fuel pressure is sufficiently decreased during this uniform charge combustion.

If the Cn becomes equal to the Cpe ("NO" at step S460) as a result of repetition of increasing the counter Cn incrementally, the auxiliary fuel injection completion flag upon returning from fuel cut XSB is set to "0" (step S520). As a result, XFC is "OFF" ("YES" at step S410) and the XSB is "ON" ("NO" at step S450) in the next control cycle. Therefore, the auxiliary fuel injection quantity QINJADD is set to "0" (step S455), and the present routine is terminated. For example, the fuel injection valve control routine upon returning from fuel cut, shown in FIG. 10, is virtually terminated.

In the fuel injection control separately performed by the ECU 4, the fuel injection from the main fuel injection valves 12 according to running status of the engine is resumed, because the XFC has become "OFF" and the XSB has become "ON". If the combustion mode is a stratified charge combustion at this time, a process of preventing shocks is performed by decreasing the fuel quantity in the beginning of the fuel injection from the main fuel injection valves 12. The fuel pressure in the delivery pipe 40 has been decreased to the fuel pressure for switching to the stratified charge combustion during the fuel injection from the auxiliary fuel injection valve 58 which was terminated shortly before. Therefore, the small quantity of fuel injection as desired can be realized without the restriction by the minimum injection time even when the fuel injection from the main fuel injection valves 12 is resumed.

Figure 11:
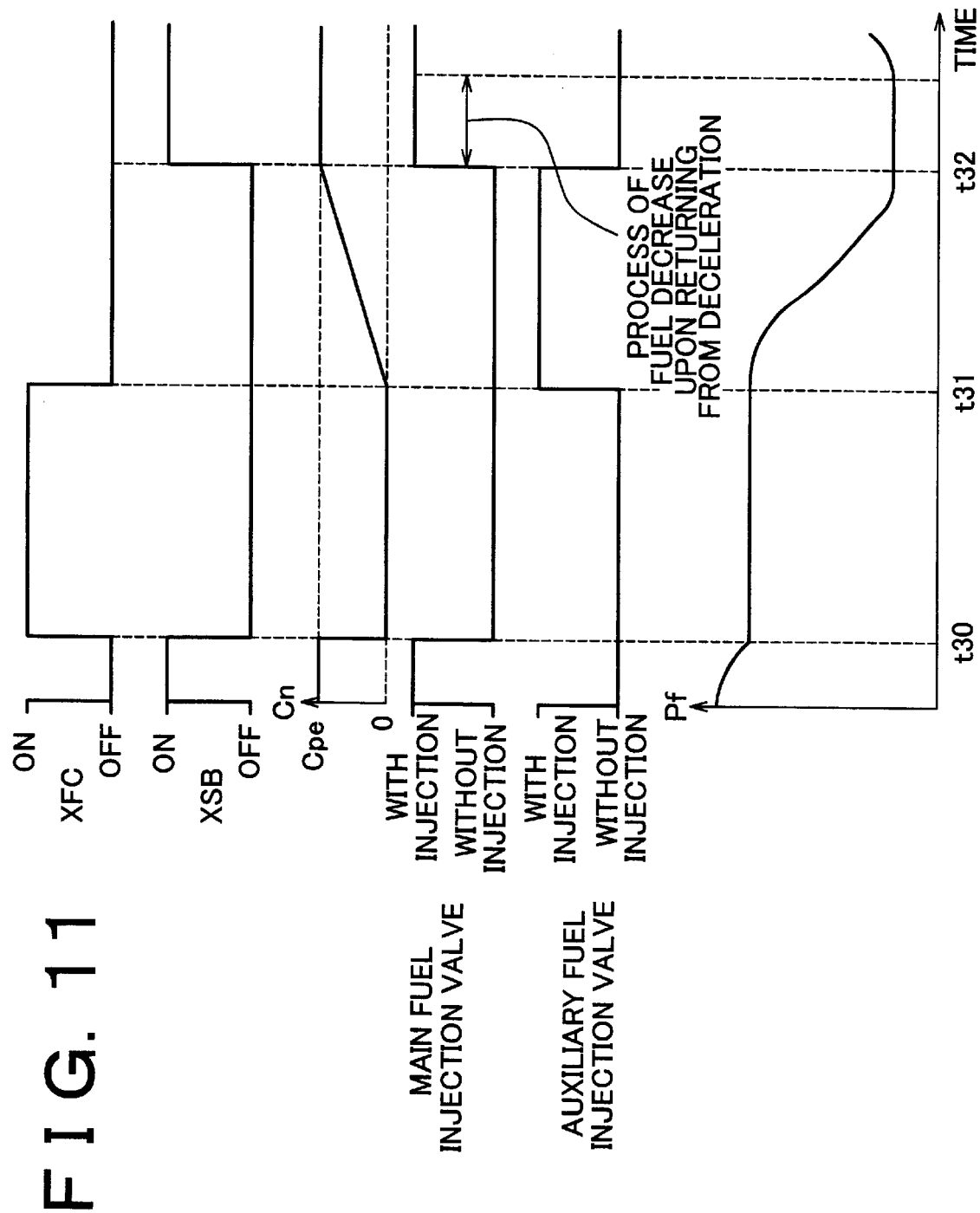
FIG. 11 is a timing chart showing an example control according to the fourth embodiment.

FIG. 11 is a timing chart showing an example control according to the present exemplary embodiment. When the fuel cut flag is switched from "OFF" to "ON" at time t30, the fuel injection from the main fuel injection valves 12 is terminated, so that the fuel is injected from neither the main fuel injection valves 12 nor the auxiliary fuel injection valve 58 at this time. Therefore, the fuel pressure Pf is not decreased since the fuel in the delivery pipe 40 is not consumed. Then the fuel cut flag is switched to "OFF" from "ON" at time t31, the uniform charge combustion is initiated in the engine 2 by the fuel injection from only the auxiliary fuel injection valve 58. The fuel in the delivery pipe 40 is consumed at this time, so that the fuel pressure Pf in the delivery pipe 40 can be decreased to the fuel pressure for switching to the stratified charge combustion by adjusting a quantity of discharge from the high-pressure pump 44.

Therefore, when the fuel injection from the main fuel injection valves 12 is resumed, the fuel pressure has been favorably low for the small quantity fuel injection. This enables adjusting of the fuel injection quantity of the main fuel injection valves 12 to be sufficiently small without the restriction by the minimum injection time.

At steps S410 and S450 and steps S460 through S500 of the fuel injection valve control routine upon returning from fuel cut, shown in FIG. 10, the injection of a small quantity of fuel is possible by assistance to decreasing the pressure of the high-pressure fuel upon fuel cut of the main fuel injection valves 12 resulting to realize depressurization of the injection pressure immediately after returning, preventing the shocks when returning from the fuel cut. Especially, the shocks are more severe if the fuel injection from the main fuel injection valves 12 is resumed when the combustion mode is the stratified charge combustion. Therefore, the effect of preventing the shocks becomes more significant in this case.

According to the fourth exemplary embodiment described above, the following effects can be achieved.

(A) The auxiliary fuel injection valve 58 is opened to realize combustion at the stoichiometric air fuel ratio shortly before returning from the fuel cut by the main fuel injection valves 12, that is, before the main fuel injection valves 12 restarts to inject the fuel. Therefore, the fuel pressure Pf in the delivery pipe 40 can sufficiently be decreased prior to resumption of the fuel injection from the main fuel injection valves 12, and the required small quantity of fuel injection can be realized. Meanwhile, although the combustion itself returns from deceleration shortly before resumption of the fuel injection from the main fuel injection valves 12 by the fuel injection from the auxiliary fuel injection valve 58, the fuel injected by the auxiliary fuel injection valve 58 is dispensed to each cylinder. Therefore, the fuel injection time is directly proportional to the number of cylinders. This enables injection of the small quantity of fuel even if the fuel pressure Pf is high. The combustion mode becomes a uniform charge combustion when the fuel is injected from the auxiliary fuel injection valve 58, so that it is more difficult for the shocks to be generated when the fuel injection from the main fuel injection valves 12 is resumed.

Finally, the other exemplary embodiments are explained below.

Figure 12:
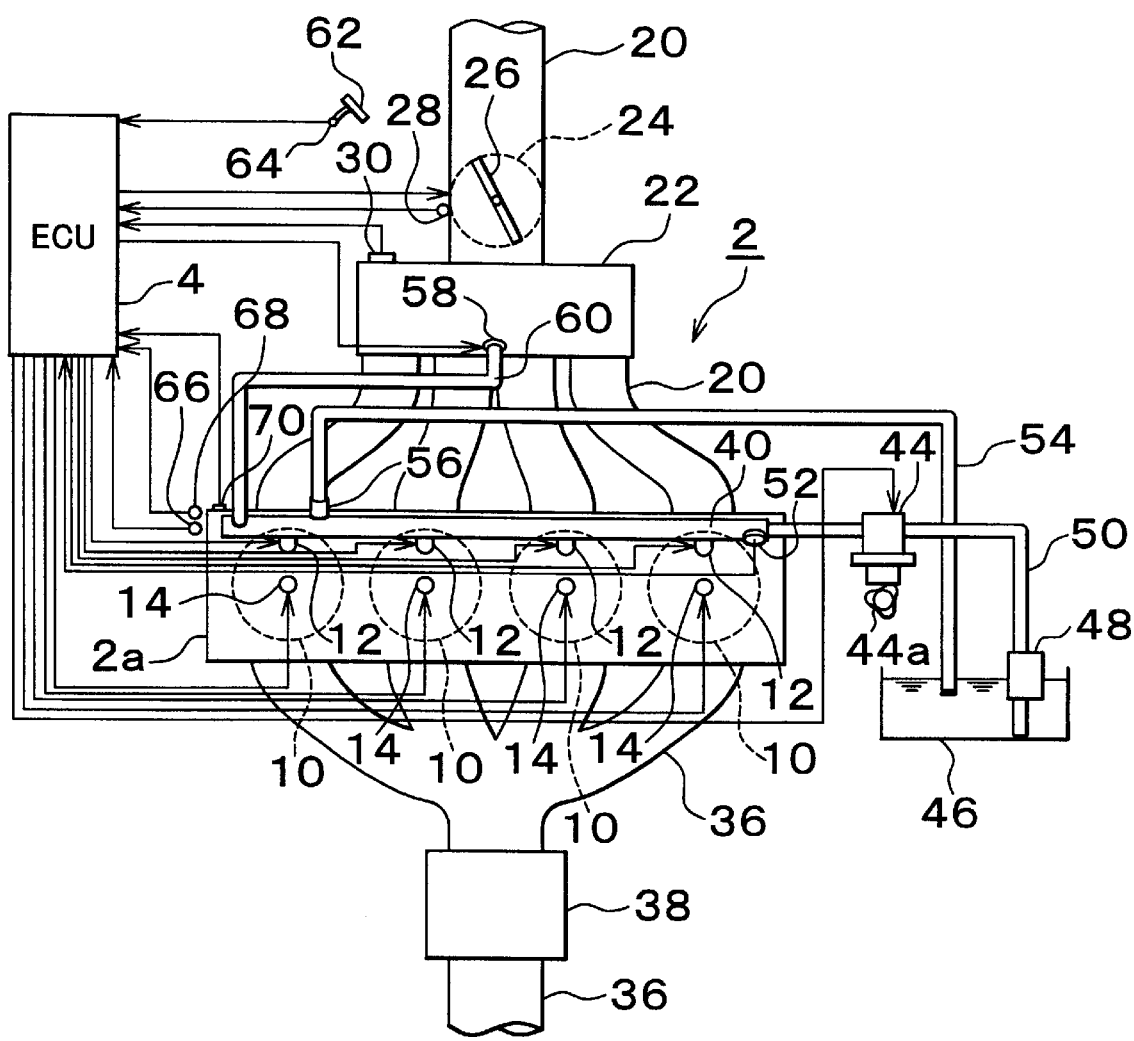
FIG. 12 is a schematic view showing a location of auxiliary fuel supply channel 60 according to the other embodiment.

According to the first exemplary embodiment, as shown in FIG. 1, the auxiliary fuel supply channel 60 is provided on the upper portion of and around the middle of the length direction of the delivery pipe 40. As shown in FIG. 12, the auxiliary fuel supply channel 60 may be provided on the opposite side of where the high-pressure fuel is supplied from the high-pressure fuel tank 44 since the fuel flow causes the vapor to move to the opposite side of the high-pressure fuel tank 44 more easily when the high-pressure fuel is supplied from the high-pressure fuel tank 44.

Although the auxiliary fuel injection valve 58 is opened by terminating fuel discharge from the high-pressure fuel pump 44 immediately after the fuel cut of the main fuel injection valves 12 according to the second embodiment, fuel injection from the auxiliary fuel injection valve 58 and fuel discharge of the high-pressure fuel pump 44 may be terminated after decreasing the fuel pressure to be desirable for the small quantity of fuel injection from the main fuel injection valves 12 by adjusting the fuel injection quantity of the auxiliary fuel injection valve 58 and the quantity of discharge from the high-pressure fuel pump 44 according to running status of the engine.

In the third exemplary embodiment, the fuel injection from the auxiliary fuel injection valve 58 is carried out during the entire fuel cut of the main fuel injection valves 12 according to running status of the engine. On the other hand, the fuel injection from the auxiliary fuel injection valve 58 may be carried out when the exhaust emission-purifying catalyst 38 deteriorates in the middle of the fuel cut of the main fuel injection valves 12, not immediately after the fuel cut, and the fuel pressure may be decreased to be desirable for the small quantity of fuel injection from the main fuel injection valves 12 at this time. Then, fuel injection from the auxiliary fuel injection valve 58 and the fuel discharge of the high-pressure fuel pump 44 may be terminated.

Although the fuel pressure is decreased to be desirable for the small quantity of fuel injection from the main fuel injection valves 12 by adjusting the fuel injection quantity of the auxiliary fuel injection valve 58 and the quantity of discharge from the high-pressure fuel pump 44 according to running status of the engine shortly before initiating the fuel injection from the main fuel injection valves 12 in the fourth exemplary embodiment, the fuel pressure may be decreased to be desirable for the small quantity of fuel injection from the main fuel injection valves 12 by temporarily opening the auxiliary fuel injection valve 58.

According to each exemplary embodiment, the auxiliary fuel injection valve 58 is supplied with the fuel from the delivery pipe 40 so that a larger quantity of fuel injection can be realized compared with the case where the fuel is supplied from the feed pump 48. Therefore, a large quantity of fuel may be injected from the auxiliary fuel injection valve 58 as well as the main fuel injection valves 12 when a throttle valve of an engine is fully opened, for example, a sports car mounted with a turbo charger or a super charger in addition to each function as described in each embodiment. This prevents the fuel injection time of the main fuel injection valves 12 from becoming very long. Therefore, a sufficiently large quantity of fuel can be supplied during processes from intake to compression without the use of high-cost injection valves with high capacity as the main fuel injection valves 12.

The fuel injection from the main fuel injection valves 12 can be terminated rapidly with the use of the auxiliary fuel injection valve 58 even when a normal quantity of fuel injection is needed since the larger quantity of fuel can be injected from the auxiliary fuel injection valve 58. Therefore, the air-fuel mixture in the combustion chambers 10 can be uniform in quality by the time for ignition, so that desirable combustion performance can be maintained.

In addition, as explained previously, the required small quantity of fuel injection can accurately be performed since the high-pressure fuel, whose fuel pressure Pf is detected by the fuel pressure sensor 52, is supplied to the auxiliary fuel injection valve 58. Therefore, in the four-cylinder engine described in each embodiment, about a quarter of the entire fuel injection is supplied to one cylinder, so that in a case where a required quantity of fuel injection is extremely small, the engine can cope with the exclusive use of the auxiliary fuel injection valve 58 even when the normal quantity of fuel injection is desired. As a result, a dynamic range, between the extremely small quantity of fuel injection and the large quantity of fuel injection by the main fuel injection valves 12 and the auxiliary fuel injection valve 58 can be extremely enlarged.

In the illustrated embodiment, the controller (the ECU 4) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fuel injection device of a cylinder injection type engine, comprising:
   a high-pressure fuel channel being supplied with a fuel by a high-pressure fuel pump that pressurizes a low-pressure fuel supplied from a fuel supplying pump;
   a main fuel injection valve connected to the high-pressure fuel channel, the main fuel injection valve injects a high-pressure fuel in the high-pressure fuel channel into each combustion chamber of the engine with plural cylinders; and
   an auxiliary fuel injection valve provided at an intake channel upstream of a branched point of the intake channel extending to each cylinder to inject the fuel thereto, the auxiliary fuel injection valve is supplied with the high-pressure fuel from the high-pressure fuel channel.

2. The fuel injection device according to claim 1, wherein:
   the high-pressure fuel is supplied to the auxiliary fuel injection valve from a point along a length of the high-pressure fuel channel.

3. The fuel injection device according to claim 1, wherein:
   the high-pressure fuel is supplied from the high-pressure fuel channel to the auxiliary fuel injection valve from a side opposite to a side supplying the high-pressure fuel to the high-pressure fuel channel.

4. The fuel injection device according to claim 1, wherein:
   the high-pressure fuel is supplied to the auxiliary fuel injection valve from an upper portion of the high-pressure fuel channel.

5. The fuel injection device according to claim 1, further comprising:
   a controller that performs an opening valve control of the auxiliary fuel injection valve for giving assistance to adjust a pressure of the fuel injected from the main fuel injection valve.

6. The fuel injection device according to claim 5, wherein:
   the controller discharges vapor by opening the auxiliary fuel injection valve to give assistance to increase the pressure of the fuel injected from the main fuel injection valve when the vapor in the high-pressure fuel channel is generated.

7. The fuel injection device according to claim 6, wherein:
   the controller opens the auxiliary fuel injection valve for a predetermined time to discharge the vapor generated in the high-pressure fuel channel.

8. The fuel injection device according to claim 6, wherein:
   the vapor is generated in the high-pressure fuel channel during a starting phase of the engine.

9. The fuel injection device according to claim 5, wherein:
   the controller opens the auxiliary fuel injection valve to discharge the fuel from the high-pressure fuel channel before the main fuel injection valve starts to inject the fuel, where decreasing the pressure of the fuel injected from the a main fuel injection valve is performed to decrease a quantity of the fuel injected from the main fuel injection valve.

10. The fuel injection device according to claim 9, wherein:
    the controller decreases the pressure of the fuel injected from the main fuel injection valve by discharging the fuel from the high-pressure fuel channel to prevent shocks generated in the engine when the main fuel injection valve restarts injecting the fuel after a fuel cut.

11. The fuel injection device according to claim 10, wherein:
    the controller opens the auxiliary fuel injection valve immediately after initiation of the fuel cut by the main fuel injection valve.

12. The fuel injection device according to claim 10, wherein:

the controller opens the auxiliary fuel injection valve during the fuel cut of the main fuel injection valve.

13. The fuel injection device according to claim 10, wherein:
the controller opens the auxiliary fuel injection valve shortly before the main fuel injection valve restarts injecting the fuel after the fuel cut.

14. The fuel injection device according to claim 10, wherein:
the fuel cut is performed when an engine revolution is decelerating.

15. The fuel injection device according to claim 9, wherein:
the pressure of the fuel injected from the main fuel injection valve decreases where the main fuel injection valve starts to inject the fuel in a stratified charge combustion mode.

16. The fuel injection device according to claim 5, wherein:
the controller performs the opening control of the auxiliary fuel injection valve, and adjusts a quantity of the fuel pumped out of the high-pressure fuel pump when the opening control of the auxiliary fuel injection valve is performed before the main fuel injection valve starts to inject the fuel, so as to decrease a fuel pressure in the high-pressure fuel channel, where decreasing the pressure of the fuel injected from the main fuel injection valve is performed to decrease the quantity of the fuel injected from the main fuel injection valve.

17. The fuel injection device according to claim 16, wherein:
the controller decreases the pressure of the fuel injected from the main fuel injection valve by discharging the fuel from the high-pressure fuel channel to prevent shocks generated in the engine when the main fuel injection valve starts to inject the fuel after fuel cut.

18. The fuel injection device according to claim 17, wherein:
the controller controls a quantity of the fuel injected from the auxiliary fuel injection valve to a quantity in which deterioration of an exhaust emission-purifying catalyst provided at an exhaust channel of the engine can be prevented.

19. The fuel injection device according to claim 17, wherein:
the controller controls a quantity of the fuel injected from the auxiliary fuel injection valve so that an air-fuel ratio in the intake channel of the engine becomes a stoichiometric air-fuel ratio.

20. The fuel injection device according to claim 16, wherein:
the pressure of the fuel injected from the main fuel injection valve decreases where the main fuel injection valve starts to inject the fuel in a stratified charge combustion mode.

21. The fuel injection device according to claim 19, wherein:
the controller opens the auxiliary fuel injection valve causing the fuel to discharge from the high-pressure fuel channel to decrease the fuel pressure therein to such a pressure that the shocks are not generated in the engine when the main fuel injection valve starts to inject the fuel in a stratified charge combustion mode before the main fuel injection valve starts to inject the fuel.

22. A fuel injection method of a cylinder injection type engine which includes: a main fuel injection valve that injects a fuel into each combustion chamber of the engine with plural cylinders, and pressurizes a low pressure fuel from a fuel supplying pump by a high-pressure fuel pump to supply a high-pressure fuel to a high-pressure fuel channel, supplying the high-pressure fuel to the main fuel injection valve from the high-pressure fuel channel, comprising steps of:
closing the main fuel injection valve to cut off fuel injection into each combustion chamber; and
injecting the high-pressure fuel in an intake channel, upstream of a branched point of the intake channel extending to each cylinder, through an auxiliary fuel injection valve from the high-pressure fuel channel when the fuel from the main fuel injection valve is cut off.

23. The fuel injection method according to claim 22, wherein:
an assistance to adjust the pressure of the fuel injected from the main fuel injection valve is given by performing an opening valve control of the auxiliary fuel injection valve.

24. The fuel injection method according to claim 23, wherein:
the fuel from the high-pressure fuel channel is discharged by opening the auxiliary fuel injection valve before the main fuel injection valve starts to inject the fuel, where decreasing the pressure of the injected fuel from the main fuel injection valve is performed to decrease a quantity of the fuel injected from the main fuel injection valve.

25. The fuel injection method according to claim 23, wherein:
the opening valve control of the auxiliary fuel injection valve is performed before the main fuel injection valve starts to inject the fuel, and a quantity of the fuel pumped out of the high-pressure fuel pump is adjusted to decrease a fuel pressure in the high-pressure fuel channel when the opening valve control is performed, where decreasing the pressure of the fuel injected from the main fuel injection valve is performed to decrease a quantity of the fuel injected from the main fuel injection valve.

* * * * *